(12) United States Patent
Sharma

(10) Patent No.: US 11,144,764 B1
(45) Date of Patent: Oct. 12, 2021

(54) SYSTEMS, METHODS, AND STORAGE MEDIA FOR SELECTING VIDEO PORTIONS FOR A VIDEO SYNOPSIS OF STREAMING VIDEO CONTENT

(71) Applicant: CBS Interactive Inc., San Francisco, CA (US)

(72) Inventor: Marc Sharma, San Francisco, CA (US)

(73) Assignee: CBS Interactive Inc., San Francisco, CA (US)

(*) Notice: Subject to any disclaimer, the term of this patent is extended or adjusted under 35 U.S.C. 154(b) by 0 days.

(21) Appl. No.: 17/039,130

(22) Filed: Sep. 30, 2020

(51) Int. Cl.
*G06K 9/00* (2006.01)
*H04N 21/431* (2011.01)
*H04N 21/439* (2011.01)
*H04N 21/233* (2011.01)

(52) U.S. Cl.
CPC ....... *G06K 9/00718* (2013.01); *H04N 21/233* (2013.01); *H04N 21/4316* (2013.01); *H04N 21/4394* (2013.01)

(58) Field of Classification Search
CPC ............. G06K 9/00718; H04N 21/233; H04N 21/4316; H04N 21/4394
See application file for complete search history.

(56) References Cited

U.S. PATENT DOCUMENTS

| 2013/0108244 A1* | 5/2013 | Konuma | G10L 25/87 386/285 |
| 2014/0043543 A1* | 2/2014 | Konuma | G11B 27/28 348/738 |
| 2014/0205102 A1* | 7/2014 | Konuma | H04R 29/008 381/56 |
| 2020/0410287 A1* | 12/2020 | Chu | G06K 9/627 |

\* cited by examiner

*Primary Examiner* — Mishawn N. Hunter
(74) *Attorney, Agent, or Firm* — Rimon PC; Marc Kaufman

(57) ABSTRACT

Systems, methods, and storage media for selecting video portions for a video synopsis of streaming video content are disclosed. Exemplary implementations may: extract at least a portion of an audio track from a live stream of video content over time to create an audio file; convert the audio file from a time domain to a frequency domain; generate a visual representation of the spectrum of frequencies of the audio signal as it varies with time; apply a classification algorithm to the visual representation to generate interest probability scores for portions of the audio signal; select portions of the audio signal that meet or exceed a threshold probability score; correlate the selected portions of the audio signal to corresponding segments of the video content that has been streamed; and select the corresponding segments of the video content for inclusion in the synopsis.

27 Claims, 7 Drawing Sheets

SYSTEMS, METHODS, AND STORAGE MEDIA FOR SELECTING VIDEO PORTIONS FOR A VIDEO SYNOPSIS OF STREAMING VIDEO CONTENT

FIELD OF THE DISCLOSURE

The present disclosure relates to systems, methods, and storage media for selecting video portions for a video synopsis of streaming video content.

BACKGROUND

On-demand streaming video content has become commonplace. For example, viewers can select on-demand content on web sites, such as YouTube™, or on various other platforms such AppleTV™ and Amazon Fire™. In particular, live streamed broadcasts, such as sporting events are very common. Further it has recently become common for users at various locations to watch content, whether live or recorded, in synchronization while connected with each other over a social network platform, in "viewing parties." Therefore, it is often desirable for a party joining a live broadcast or viewing party late to want to "catch up" by viewing scenes that present a synopsis of the content thus far in a time-compressed manner. The term "synopsis," as used herein, refers to any summation of content that provides the user with information about the character of content that has been streamed.

It is known to extract portions of interest from video content. For example, U.S. Pat. No. 9,888,279 teaches a method for receiving video content and metadata associated with the video content and extracting features of the video content based on the metadata. Portions of the visual, audio, and textual features are fused into composite features and a set of video segments of the video content is identified based on the composite features of the video content. Further, U.S. Pat. No. 10,395,122 teaches identifying portions of video content based "capture information" such as location information, capture time information, capture motion information, audio information, interest curve information, average color information, and histogram information.

However, "catch-up content" is assembled largely manually, and thus it is difficult to create catch-up content in real time and in a flexible manner. Further, it is known to create a spectrograph of the corresponding soundtrack to classify image segments. However, known techniques are too slow to be applied in real time in a manner that allows creation of catch-up content while the video content is being streamed.

SUMMARY

The disclosed implementations enable an automated system for selecting segments of streamed content via audio analysis and stitching them together to provide editors with a complete synopsis of the streamed content up to a predetermined time, such as a current time. By monitoring the audio track of streaming video content, such as the audio from a sports commentator's box in the case of a streaming sporting event, implementations minimize the analysis to only one signal. A domain specific neural network image classification algorithm can be applied to a visual representation of the sound track to generate interest probability scores for portions of the audio signal which can be correlated to desired portions of the video signal that can be selected for use in a synopsis.

One aspect of the present disclosure relates to a system configured for selecting video portions for a video synopsis of streaming video content. The system may include one or more hardware processors configured by machine-readable instructions. The processor(s) may be configured to extract at least a portion of an audio track from a live stream of video content over time to create an audio file. The processor(s) may be configured to convert the audio file from a time domain to a frequency domain to create an audio signal as a superposition of sinusoids of varying magnitudes, frequencies, and phase offsets. The processor(s) may be configured to generate a visual representation of the spectrum of frequencies of the audio signal as it varies with time. The processor(s) may be configured to apply a domain specific image classification algorithm to the visual representation to generate interest probability scores for portions of the audio signal. The processor(s) may be configured to select portions of the audio signal that meet or exceed a threshold probability score. The processor(s) may be configured to correlate the selected portions of the audio signal to corresponding segments of the video content that has been streamed. The processor(s) may be configured to select the corresponding segments of the video content for inclusion in the synopsis.

Another aspect of the present disclosure relates to a method for selecting video portions for a video synopsis of streaming video content. The method may include extracting at least a portion of an audio track from a live stream of video content over time to create an audio file. The method may include converting the audio file from a time domain to a frequency domain to create an audio signal as a superposition of sinusoids of varying magnitudes, frequencies, and phase offsets. The method may include generating a visual representation of the spectrum of frequencies of the audio signal as it varies with time. The method may include applying a domain specific image classification algorithm to the visual representation to generate interest probability scores for portions of the audio signal. The method may include selecting portions of the audio signal that meet or exceed a threshold probability score. The method may include correlating the selected portions of the audio signal to corresponding segments of the video content that has been streamed. The method may include selecting the corresponding segments of the video content for inclusion in the synopsis.

Yet another aspect of the present disclosure relates to a non-transient computer-readable storage medium having instructions embodied thereon, the instructions being executable by one or more processors to perform a method for selecting video portions for a video synopsis of streaming video content. The method may include extracting at least a portion of an audio track from a live stream of video content over time to create an audio file. The method may include converting the audio file from a time domain to a frequency domain to create an audio signal as a superposition of sinusoids of varying magnitudes, frequencies, and phase offsets. The method may include generating a visual representation of the spectrum of frequencies of the audio signal as it varies with time. The method may include applying a domain specific image classification algorithm to the visual representation to generate interest probability scores for portions of the audio signal. The method may include selecting portions of the audio signal that meet or exceed a threshold probability score. The method may include correlating the selected portions of the audio signal to corresponding segments of the video content that has been streamed. The method may include selecting the corresponding segments of the video content for inclusion in the synopsis.

SUMMARY

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
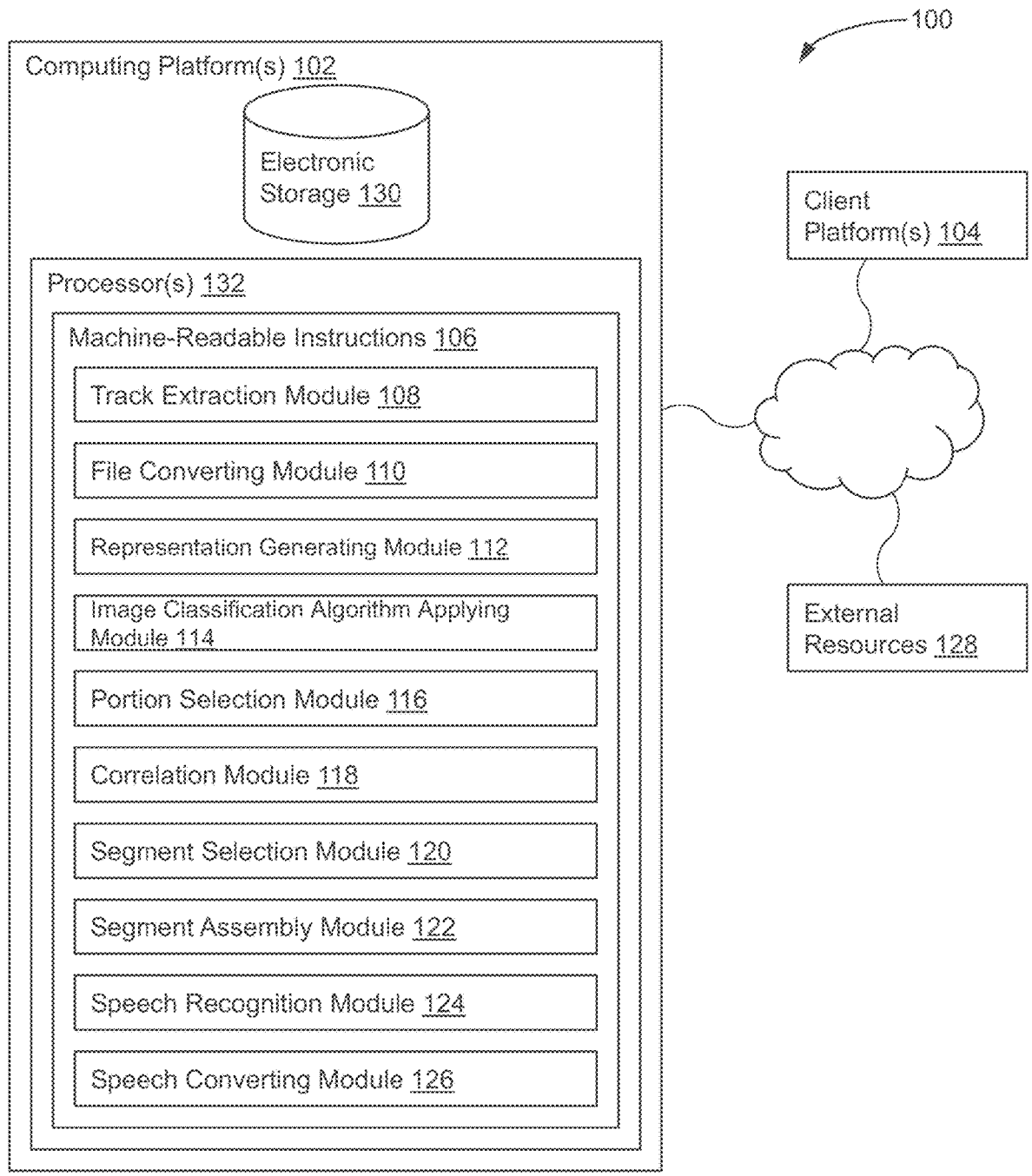
FIG. 1 illustrates a system configured for selecting video portions for a video synopsis of streaming video content, in accordance with one or more implementations.

FIG. 1 illustrates system 100 configured for selecting video portions for use in a video synopsis of streaming video content, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include one or more of track extraction module 108, file converting module 110, representation generating module 112, image classification algorithm applying module 114, selection module 116, correlation module 118, segment selection module 120, segment assembly module 122, speech recognition module 124, speech converting module 126, and/or other instruction modules.

Track extraction module 108 may be configured to extract at least a portion of an audio track from a live stream of video content over time to create an audio file. For example, the live stream may be a live sporting event streamed by external resources 128, such as a content streaming service. The audio file can be obtained from static storage, such as a cloud server, or by connecting to a live stream and cutting samples, 10 second samples for example, from the video source. The audio from each sample can be stripped and saved into .wav formats or any other appropriate sound file format.

Figure 2:
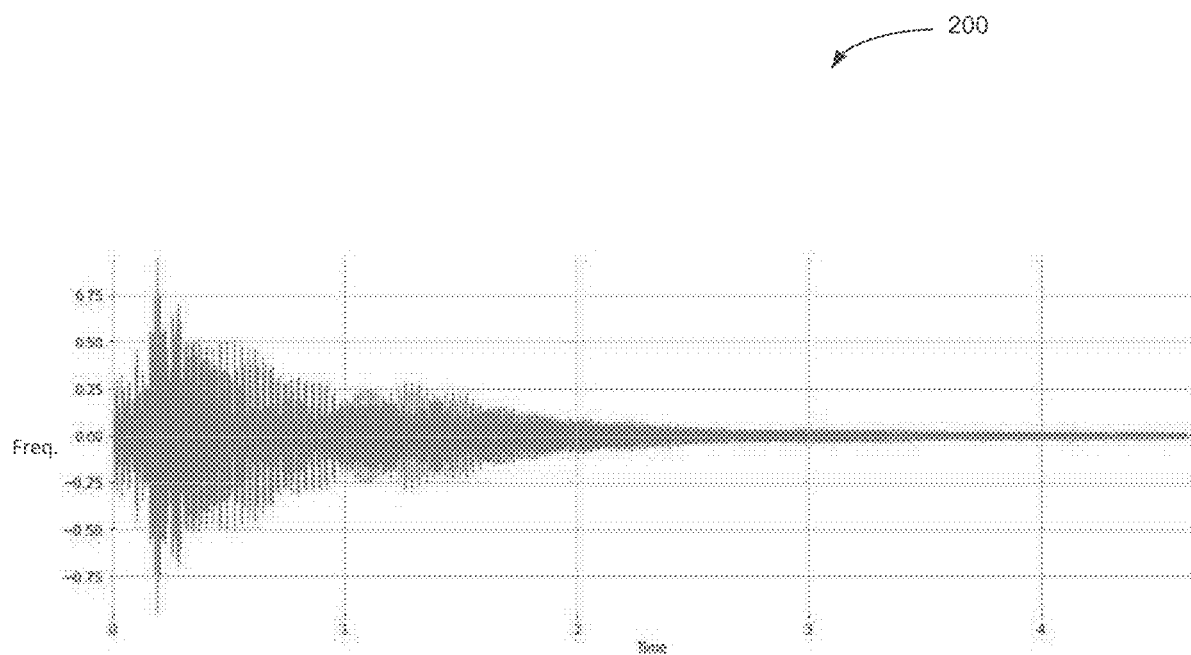
FIG. 2 illustrates a graphed example of an audio signal in the time domain.
Figure 3:
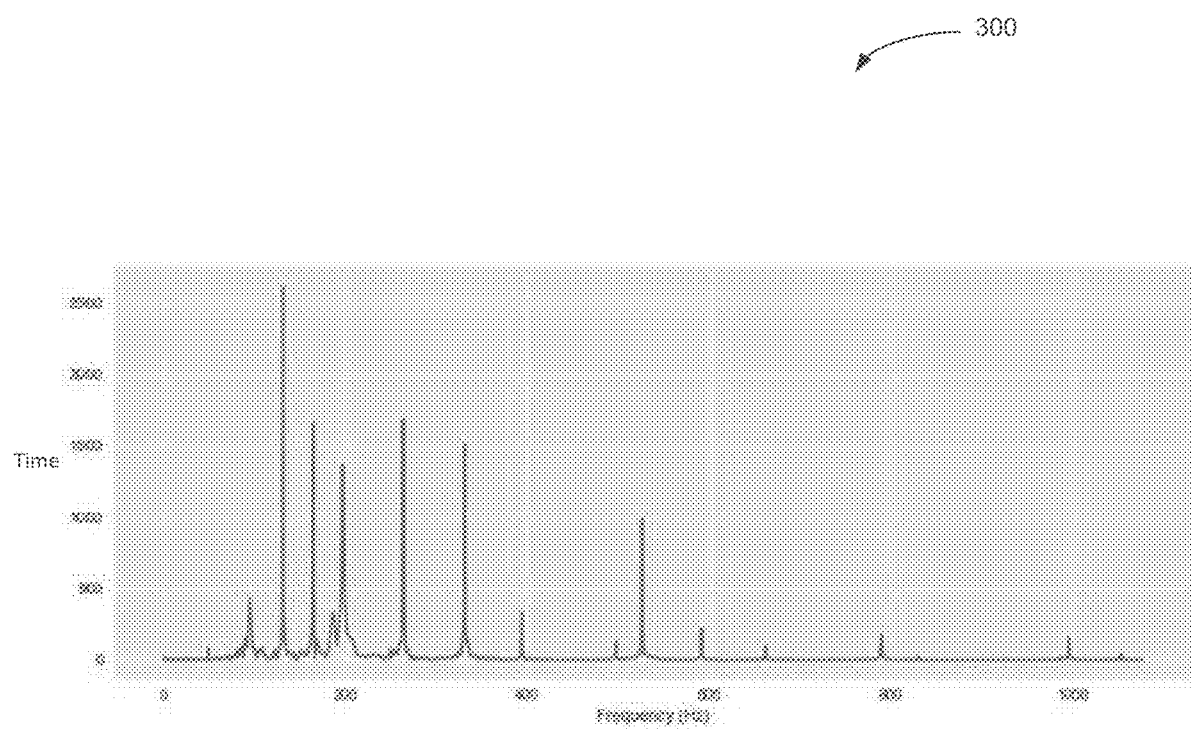
FIG. 3 illustrates the signal of FIG. 2. graphed in the frequency domain.

FIG. 2 illustrates a graph 200 of an example of an audio signal in the frequency Domain, where the horizontal (x) axis is time and the vertical (y) axis is frequency in Hz. File converting module 110 may be configured to convert the audio file from a time domain to a frequency domain to create an audio signal as a superposition of sinusoids of varying magnitudes, frequencies, and phase offsets. FIG. 3 illustrates a graph 300 of an example of an audio signal in the frequency Domain, where the horizontal (x) axis is frequency and the vertical (y) axis is time in Hz. As an example, file converting module 110 can apply at Fourier Transform to the time-based audio signal to obtain the frequency domain signal. Whereas the time domain expresses the signal as a sequence of samples, the frequency domain expresses the signal as a superposition of sinusoids of varying magnitudes, frequencies, and phase offsets.

Some sound signals, such as musical signals are highly non-stationary, i.e., their statistics change over time. It would be somewhat meaningless to compute a single Fourier transform over an entire song. Therefore, a short-time Fourier transform (STFT) can be obtained by computing the Fourier transform for successive frames in a signal.

$$X(m,\omega)=\Sigma n x(n)w(n-m)e\text{-}jwn$$

As m is increased, the window function w can be moved to the right. For the resulting frame, x(n)w(n-m), the Fourier transform can be calculated. Therefore, the STFT X is a function of both time, m, and frequency, ω.

Figure 4:
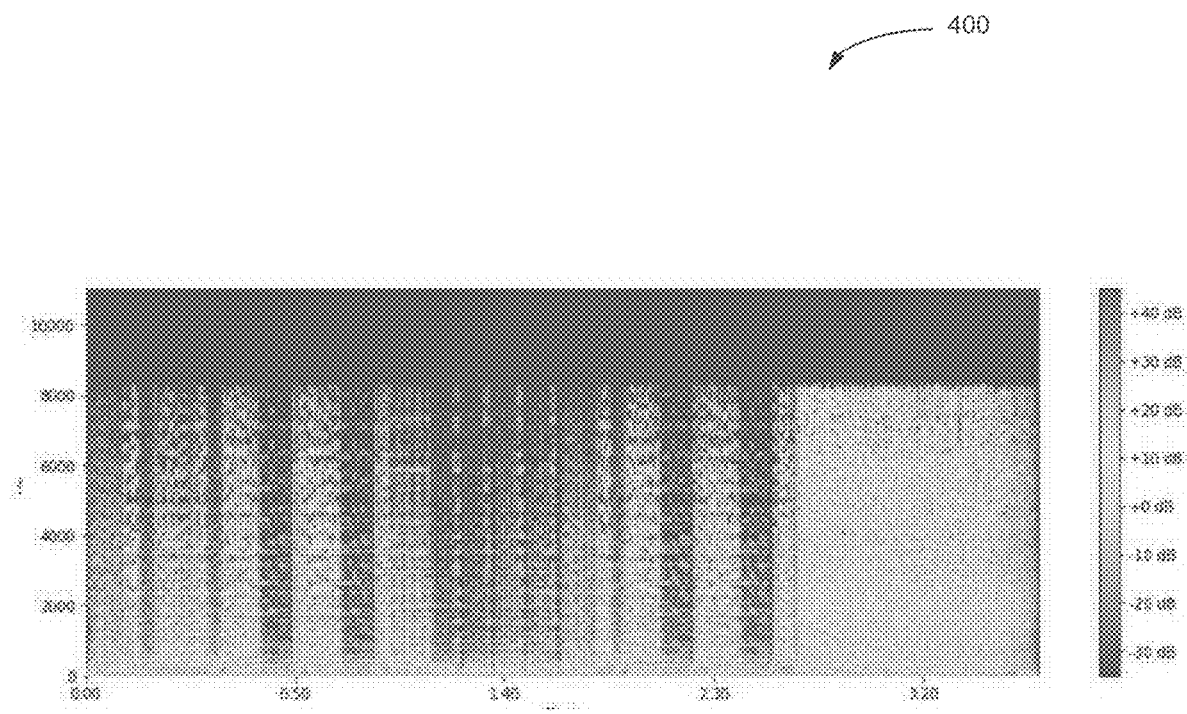
FIG. 4 illustrates and example of a Mel-Spectrum spectrogram.
Figure 5:
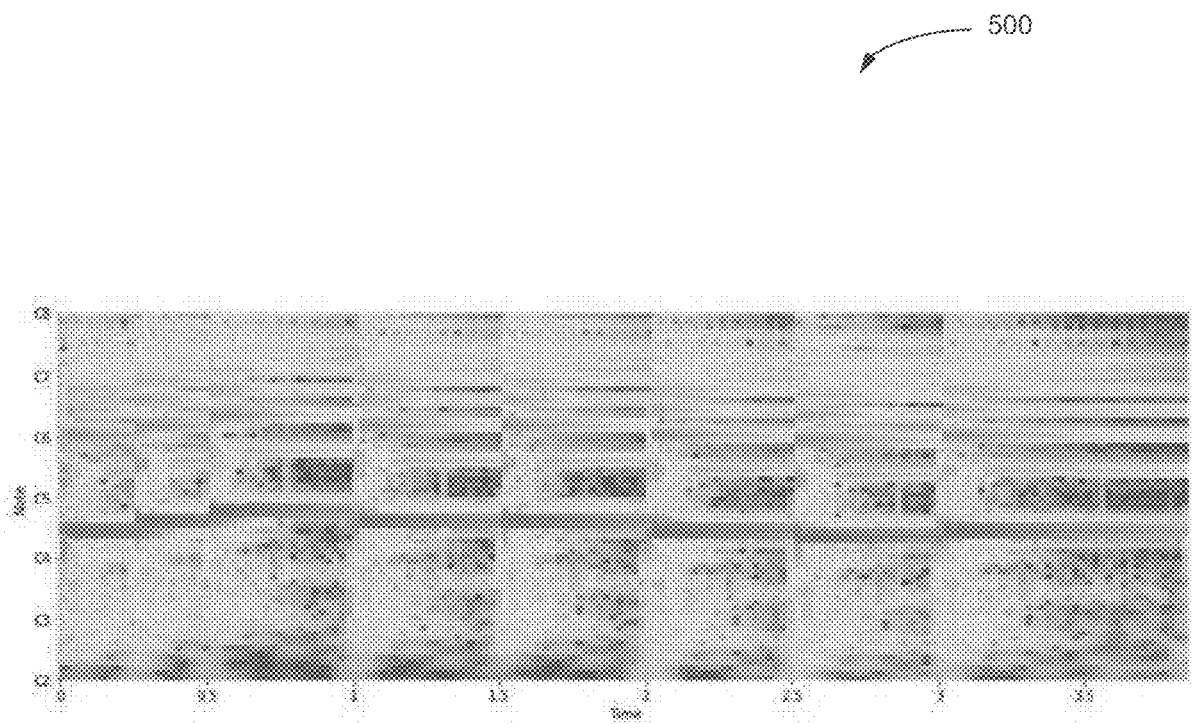
FIG. 5 illustrates and example of a Constant-Q spectrogram.

Returning to FIG. 1, representation generating module 112 may be configured to generate a visual representation of the spectrum of frequencies of the frequency domain audio signal as it varies with time. The visual representation of the spectrum of frequencies of the audio signal can be, for example, Mel-Spectrum Spectograph (400 in FIG. 4) or a Constant-Q Representation spectrogram (500 in FIG. 5). A spectrogram shows the intensity of frequencies over time. A spectrogram can be simply the squared magnitude of the STFT:

$$S(m,\omega)=|X(m,\omega)|2$$

The human perception of sound intensity is logarithmic in nature. Therefore, we are often interested in the log amplitude of the audio signal. In the case of a Mel-Spectrum Spectrograph, a cleanup step can be applied to clear away overtones and other distortions.

Image classification algorithm applying module 114 may be configured to apply a domain specific neural network image classification algorithm to the visual representation to generate interest probability scores for various portions of the audio signal. The domain specific neural network may be configured as a classifier which outputs probabilities for each of plural class labels. Labels can include significant words that identify corresponding video content, such as "goal", "penalty" or the like in the case of a sporting event.

The spectrogram image is fed into image classification algorithm applying module 114 which outputs probabilities for each of the class labels, which for this can be bi-nomial (for example "goal" or "no-goal") or multi-nom ial (for example goal, yellow-card, red-card, penalty etc.) If the model detects a label of interest the segment is returned, possibly with some buffer time before and/or after the portion in which the label is detected. Speech recognition module 124 can output the words that the commentators are speaking at the time. The labels predicted by module 114 are string-compared to a predefined list of words of interest, such as "goal". If there's a match, then the probability score is increased. The data object returned from image classification algorithm applying module 114 (including optional results from speech recognition module 124) contains the label and the start and end times of the video where it occurred.

As noted above, image classification algorithm applying module 114 may be configured to apply a domain specific neural network image classification algorithm. For example, the convolutional network (ConvNet), a specific artificial neural network topology that is inspired by biological visual cortex and is analogous to that of the connectivity pattern of neurons in the human brain, can be used. A ConvNet is able to successfully capture the spatial and temporal dependencies in an image through the application of relevant filters.

Figure 6:
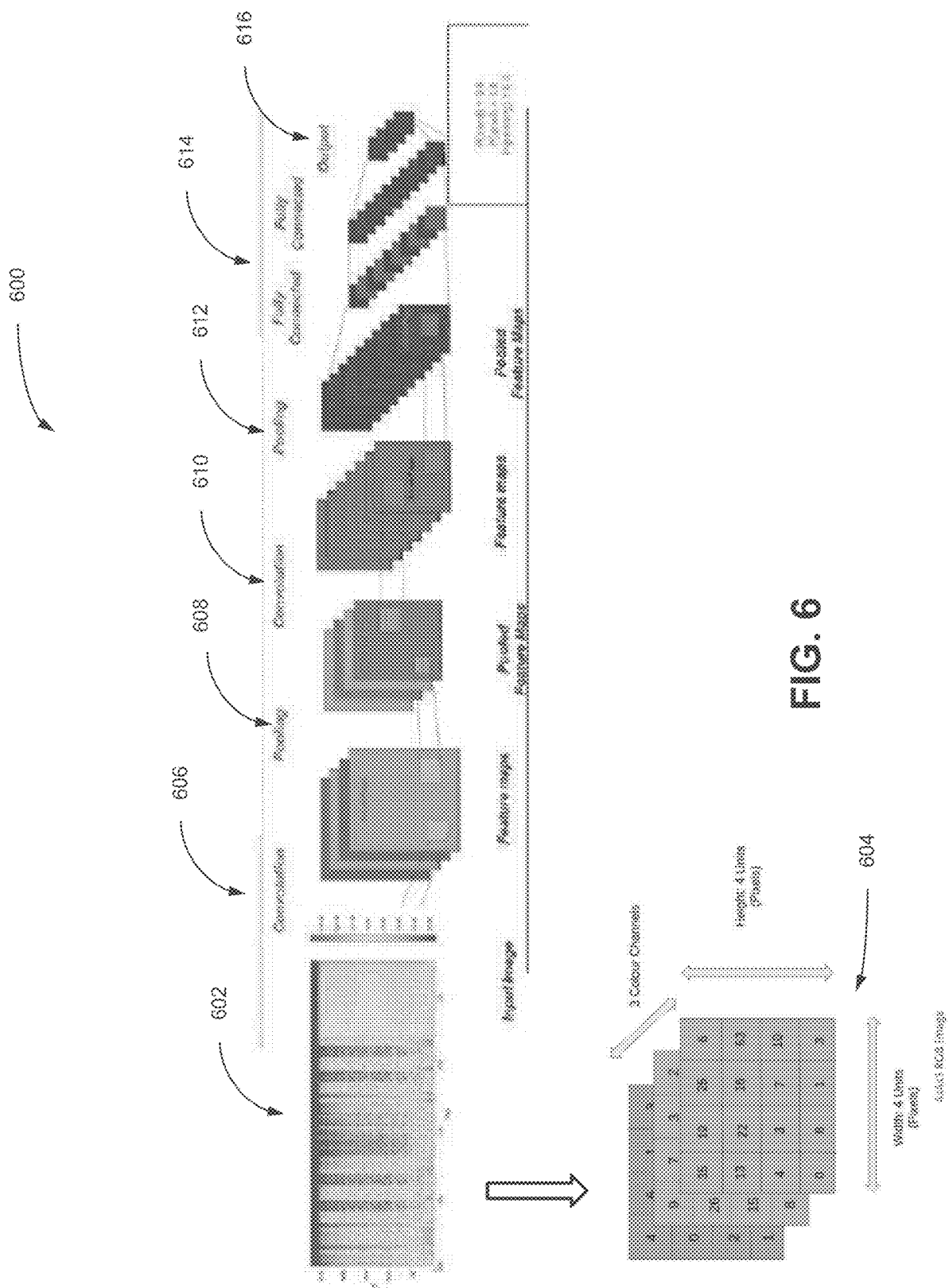
FIG. 6 illustrates a Neural Network classifier in accordance with one or more implementations.

FIG. 6 illustrates ConvNet Neural Network architecture 600 in accordance with a disclosed implementation. Architecture 600 follows the general architecture of a Convolutional Neural Network. The layers are as follows: Input Image 602→Convolution Layer 606→Pooling Layer 608→Convolution Layer 610→Pooling Layer 612→Fully connected layer (x2) 614→output layer 616. As noted above, the input image can be a Mel-Spectrum spectrogram 602 (or other de-noised spectrogram or visualization of the audio file). The Spectrogram can be represented by 4×4×3 (4 pixels by 4 pixels by 3 color channels) image 604.

The objective of the convolution operation performed by the neural network is to extract the high-level features, such as edges, from the input image. Convolution operations are well-known generally. The high-level feature is extracted by the convolution layer. The pooling layer accomplishes a form of non-linear down-sampling in a well-known manner. There are several known non-linear functions to implement pooling among which max pooling is the most common. It partitions the input image into a set of non-overlapping rectangles and, for each such sub-region, outputs the maximum. Another pooling function is known as "average pooling" which returns the average of all the values from the portion of the image.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation can be used as another form of translation invariance. The pooling layer operates independently on every depth slice of the input and resizes it spatially. The most common form is a pooling layer with filters of size 2×2 applied with a stride of 2 downsamples at every depth slice in the input by 2 along both width and height, discarding 75% of the activations.

The fully-connected layer is a known way of learning non-linear combinations of the high-level features as represented by the output of the convolutional layer. The fully-connected layer is learning a possibly non-linear function in that space. The flattened output can be fed to a feed-forward neural network and backpropagation can be applied to every iteration of training. Over a series of epochs, the model is able to distinguish between dominating and certain low-level features in images and classify them using the Softmax classification technique. The Softmax function is a known function used in various multiclass classification methods, such as multinomial logistic regression (also known as Softmax regression), multiclass linear discriminant analysis, naive Bayes classifiers, and artificial neural networks.

Returning again to FIG. 1, portion selection module 116 may be configured to select portions of the audio signal that meet or exceed a threshold probability score as determined by module 114. Portion correlation module 118 may be configured to correlate the selected portions of the audio signal to corresponding segments of the video content that has been streamed. Segment selection module 120 may be configured to select the corresponding segments of the video content for inclusion in the synopsis. Segment assembly module 122 may be configured to assemble the corresponding segments in a time-based manner to create catch-up content during streaming of the video content.

As noted above speech recognition module 124 may be configured to recognize speech in the audio file. Speech converting module 126 may be configured to convert the speech to text. Selecting portions of the audio signal that may meet or exceed a threshold probability score may include, in addition to applying a domain specific neural network image classification algorithm as noted above, matching the text to words having a high probability of corresponding to video content of interest. As one simple example, the words "they score" in the soundtrack, could very well be indicative that the corresponding video segment is of interest.

In another implementation, image classification algorithm applying module 114 can implement a classifier model based on embeddings. In such a case, the audio snippets can be converted into a type of audio embedding as per the open sourced tensor flow VGGish audio classification model. These embeddings are only created after the VGGish model is re-trained on prepared data. Then, the updated weights from the model are loaded into the classifier. Input audio files are transformed embeddings and are evaluated using the updated model. Output probabilities are weighted with the results of the concurrent speech recognition model as above and the returned data object follows the same structure.

In another implementation, image classification algorithm applying module 114 can implement a variable auto encoder (VAE). A preloaded VGG classifier can be retrained in a VAE network architecture then the latent representation of the class label can be extracted and used in a classifier. The concept is similar to using embeddings. However, the difference is that the model that is used for classification is built differently. The VAE essentially produces a compact latent representation of the input audio files. This representation can be used to sample and generate new audio files, or to determine whether an input file is from the same class. Once these probabilities are calculated, they are weighted by the speech recognition model and the final data structure is returned.

In some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute modules 108, 110, 112, 114, 116, 118, 120, 122, 124, and/or 126, and/or other modules. Processor(s) 132 may be configured to execute modules 108, 110, 112, 114, 116, 118, 120, 122, 124, and/or 126, and/or other modules by software; hardware; firmware; some combination of software, hardware, and/or firmware; and/or other mechanisms for configuring processing capabilities on processor(s) 132. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules are illustrated in FIG. 1 as being implemented within a single processing unit, in implementations in which processor(s) 132 includes multiple processing units, one or more of the modules may be implemented remotely from the other modules. The description of the functionality provided by the different modules is for illustrative purposes, and is not intended to be limiting, as any of modules may provide more or less functionality than is described. For example, one or more of modules 108, 110, 112, 114, 116, 118, 120, 122, 124, and/or 126 may be eliminated, and some or all of its functionality may be provided by other modules. As another example, processor(s) 132 may be configured to execute one or more additional modules that may perform some or all of the functionality attributed below to one of modules 108, 110, 112, 114, 116, 118, 120, 122, 124, and/or 126.

Figure 7:
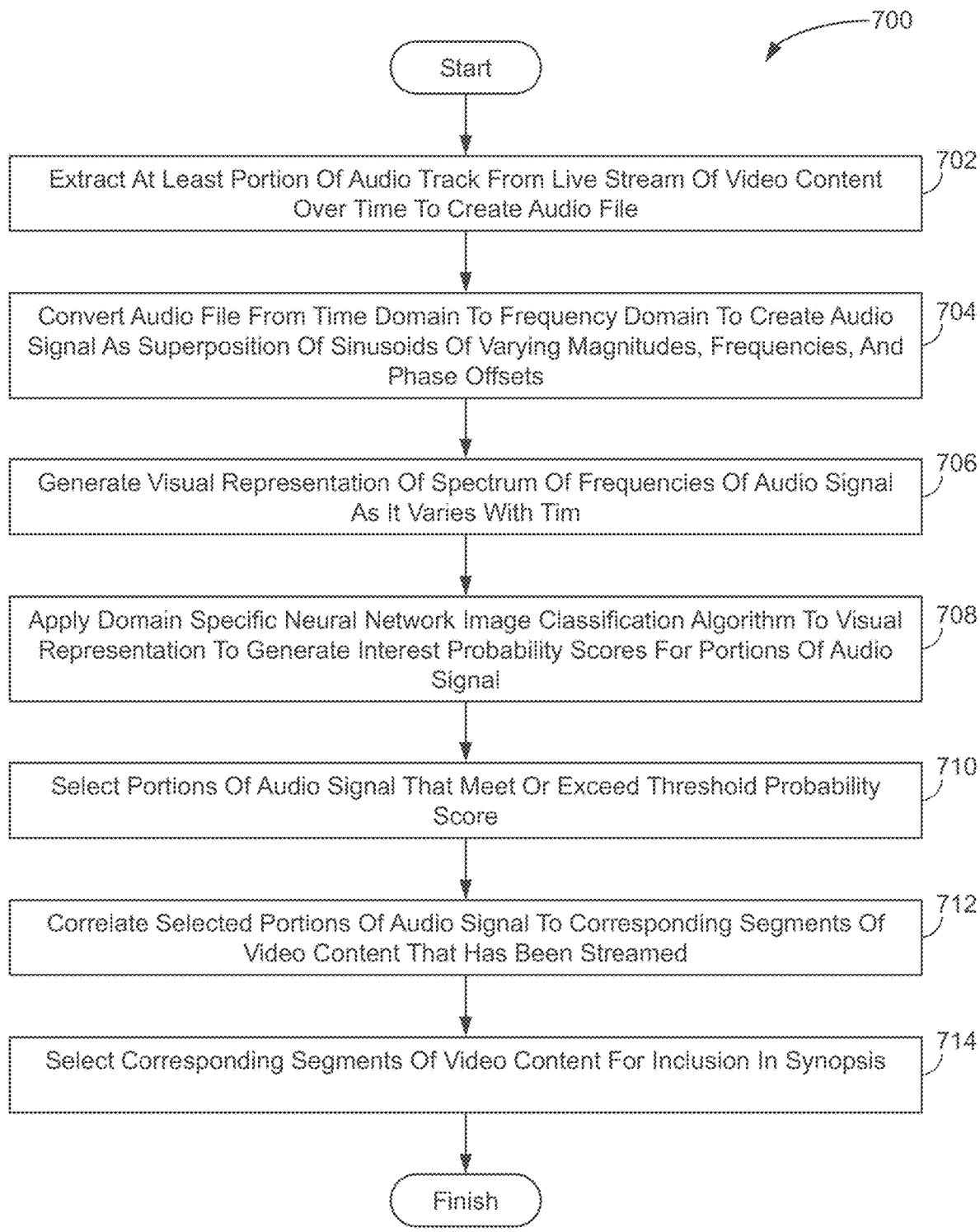
FIG. 7 illustrates a method for selecting video portions for a video synopsis of streaming video content, in accordance with one or more implementations.

FIG. 7 illustrates a method 400 for selecting video portions for a video synopsis of streaming video content, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

An operation 702 may include extracting at least a portion of an audio track from a live stream of video content over time to create an audio file. Operation 702 may be performed by one or more hardware processors configured by machine-readable instructions including a module that is the same as or similar to track extraction module 108, in accordance with one or more implementations.

An operation 704 may include converting the audio file from a time domain to a frequency domain to create an audio signal as a superposition of sinusoids of varying magnitudes, frequencies, and phase offsets. Operation 704 may be performed by one or more hardware processors configured by machine-readable instructions including a module that is the same as or similar to file converting module 110, in accordance with one or more implementations.

An operation 706 may include generating a visual representation of the spectrum of frequencies of the audio signal as it varies with time. Operation 706 may be performed by one or more hardware processors configured by machine-readable instructions including a module that is the same as or similar to representation generating module 112, in accordance with one or more implementations.

An operation 708 may include applying a domain specific neural network image classification algorithm to the visual representation to generate interest probability scores for portions of the audio signal. Operation 708 may be performed by one or more hardware processors configured by machine-readable instructions including a module that is the same as or similar to network image classification algorithm applying module 114, in accordance with one or more implementations.

An operation 710 may include selecting portions of the audio signal that meet or exceed a threshold probability score. Operation 710 may be performed by one or more hardware processors configured by machine-readable instructions including a module that is the same as or similar to portion selection module 116, in accordance with one or more implementations.

An operation 712 may include correlating the selected portions of the audio signal to corresponding segments of the video content that has been streamed. Operation 712 may be performed by one or more hardware processors configured by machine-readable instructions including a module that is the same as or similar to portion correlation module 118, in accordance with one or more implementations.

An operation 714 may include selecting the corresponding segments of the video content for inclusion in the synopsis. Operation 714 may be performed by one or more hardware processors configured by machine-readable instructions including a module that is the same as or similar to segment selection module 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for selecting video portions of high viewer interest from streaming video content, the system comprising:
   one or more hardware processors configured by machine-readable instructions to:
      extract at least a portion of an audio track from a live stream of video content over time to create an audio file;
      convert the audio file from a time domain to a frequency domain to create a frequency domain audio signal as a superposition of sinusoids of varying magnitudes, frequencies, and phase offsets;
      generate a representation of the spectrum of frequencies of the frequency domain audio signal as it varies with time;
      apply a domain specific neural network image classification algorithm to the representation to generate interest probability scores for portions of the audio signal;
      select portions of the audio signal that meet or exceed a threshold probability score;
      correlate the selected portions of the audio signal to corresponding segments of the video content that has been streamed; and
      mark the corresponding segments of the video content as being of high viewer interest.

2. The system of claim 1, wherein the one or more hardware processors are further configured by machine-readable instructions to assemble the corresponding segments in a time-based manner to create catch-up content during streaming of the video content.

3. The system of claim 1, wherein the converting includes applying a Fourier Transform to the audio file.

4. The system of claim 3, wherein the Fourier Transform a short-time Fourier Transform obtained by computing the Fourier Transform for successive frames of the audio signal.

5. The system of claim 1, wherein the one or more hardware processors are further configured by machine-readable instructions to:
   recognize speech in the audio file;
   convert the speech to text;
   wherein selecting portions of the audio signal that meet or exceed a threshold probability score includes matching the text to words having a high probability of corresponding to video content of interest.

6. The system of claim 1, wherein the representation of the spectrum of frequencies of the audio signal as it varies with time is a Mel Spectrogram.

7. The system of claim 1, wherein the domain specific neural network is configured as a classifier which outputs probabilities for each of plural class labels.

8. The system of claim 1 wherein generating the representation of the spectrum of frequencies of the audio signal as it varies with time is generated by inserting classification embeddings into the frequency domain audio signal.

9. The system of claim 1, wherein the hardware processors are further configured by machine-readable instructions to select the corresponding portions for inclusion in a synopsis of the streaming video content.

10. A computer implemented method for selecting video portions synopsis of high viewer interest from streaming video content, the method comprising:
   extracting at least a portion of an audio track from a live stream of video content over time to create an audio file;
   converting the audio file from a time domain to a frequency domain to create a frequency domain audio signal as a superposition of sinusoids of varying magnitudes, frequencies, and phase offsets;
   generating a representation of the spectrum of frequencies of the frequency domain audio signal as it varies with time;
   applying a domain specific neural network image classification algorithm to the representation to generate interest probability scores for portions of the audio signal;
   selecting portions of the audio signal that meet or exceed a threshold probability score;
   correlating the selected portions of the audio signal to corresponding segments of the video content that has been streamed; and marking the corresponding segments of the video content as being of high viewer interest.

11. The method of claim 10, further comprising assembling the corresponding segments in a time-based manner to create catch-up content during streaming of the video content.

12. The method of claim 10, wherein the converting includes applying a Fourier Transform to the audio file.

13. The method of claim 10, wherein the Fourier Transform a short-time Fourier Transform obtained by computing the Fourier Transform for successive frames of the audio signal.

14. The method of claim 10, further comprising:
recognizing speech in the audio file;
converting the speech to text; and
wherein selecting portions of the audio signal that meet or exceed a threshold probability score includes matching the text to words having a high probability of corresponding to video content of interest.

15. The method of claim 10, wherein the representation of the spectrum of frequencies of the audio signal as it varies with time is a Mel Spectrogram.

16. The method of claim 10, wherein the domain specific neural network is configured as a classifier which outputs probabilities for each of plural class labels.

17. The computer-readable storage medium of claim 16, wherein the method further comprises:
recognizing speech in the audio file;
converting the speech to text; and
wherein selecting portions of the audio signal that meet or exceed a threshold probability score includes matching the text to words having a high probability of corresponding to video content of interest.

18. The method of claim 10 wherein generating the representation of the spectrum of frequencies of the audio signal as it varies with time is generated by inserting classification embeddings into the frequency domain audio signal.

19. The method of claim 10, further comprising selecting the corresponding portions for inclusion in a synopsis of the streaming video content.

20. A non-transient computer-readable storage medium having instructions embodied thereon, the instructions being executable by one or more processors to perform a method for selecting video portions of high viewer interest from streaming video content, the method comprising:
extracting at least a portion of an audio track from a live stream of video content over time to create an audio file;
converting the audio file from a time domain to a frequency domain to create a frequency domain audio signal as a superposition of sinusoids of varying magnitudes, frequencies, and phase offsets;
generating a representation of the spectrum of frequencies of the frequency domain audio signal as it varies with time;
applying a domain specific neural network image classification algorithm to the representation to generate interest probability scores for portions of the audio signal;
selecting portions of the audio signal that meet or exceed a threshold probability score;
correlating the selected portions of the audio signal to corresponding segments of the video content that has been streamed; and
marking the corresponding segments of the video content as being of high viewer interest.

21. The computer-readable storage medium of claim 20, wherein the method further comprises assembling the corresponding segments in a time-based manner to create catch-up content during streaming of the video content.

22. The computer-readable storage medium of claim 20, wherein the converting includes applying a Fourier Transform to the audio file.

23. The computer-readable storage medium of claim 20, wherein the Fourier Transform a short-time Fourier Transform obtained by computing the Fourier Transform for successive frames of the audio signal.

24. The computer-readable storage medium of claim 20, wherein the representation of the spectrum of frequencies of the audio signal as it varies with time is a Mel Spectrogram.

25. The computer-readable storage medium of claim 20, wherein the domain specific neural network is configured as a classifier which outputs probabilities for each of plural class labels.

26. The computer-readable storage medium of claim 20 wherein generating the representation of the spectrum of frequencies of the audio signal as it varies with time is generated by inserting classification embeddings into the frequency domain audio signal.

27. The computer-readable storage medium of claim 20, wherein the method further comprises selecting the corresponding portions for inclusion in a synopsis of the streaming video content.

* * * * *